United States Patent [19]

Kutscher et al.

[11] Patent Number: 4,538,699
[45] Date of Patent: Sep. 3, 1985

[54] FLUID-CUSHION SUPPORTING ARRANGEMENT FOR HORIZONTAL CONVEYANCE

[75] Inventors: Fritz Kutscher, Leipzig; Christian Zschocke, Erdmannsdorf-Augustusburg, both of German Democratic Rep.

[73] Assignee: Bauakademie der Deutschen Demokratischen Republik, Berlin, German Democratic Rep.

[21] Appl. No.: 480,664

[22] Filed: Mar. 31, 1983

[30] Foreign Application Priority Data

Apr. 20, 1982 [DD] German Democratic Rep. ... 239145

[51] Int. Cl.³ .............................................. B60V 1/00
[52] U.S. Cl. .................................. 180/125; 104/23 FS
[58] Field of Search ............... 180/125, 126, 124, 119, 180/120; 104/23 FS

[56] References Cited

U.S. PATENT DOCUMENTS 3,055,446  9/1962  Vaughen ............................ 180/125
3,082,836  3/1963  Billman .............................. 180/124
3,768,588 10/1973  Vaughen ............................ 180/124

OTHER PUBLICATIONS

Cern, Pneumatic Platform, The Engineer, 12/9/60.

Primary Examiner—John A. Pekar
Attorney, Agent, or Firm—Michael J. Striker

[57] ABSTRACT

A fluid-cushion supporting arrangement for horizontal conveyance has a supporting platform, a flexible angular sealing element arranged under the platform in the region of its marginal portion and formed as a sealing piston with a horizontal leg forming together with the supporting platform a fluid chamber and a vertical leg forming together with the supporting platform a control pressure chamber, a pressure-regulating device through which the chambers communicate with one another so that the fluid from the fluid chamber can act upon the control pressure chamber in a pressure-dependent manner, and first and second sensors which are parts of the inlet and the pressure-regulating element and brought in contact with the horizontal leg and the vertical leg of the sealing piston, respectively.

8 Claims, 2 Drawing Figures

FLUID-CUSHION SUPPORTING ARRANGEMENT FOR HORIZONTAL CONVEYANCE

BACKGROUND OF THE INVENTION

The present invention relates to a fluid-cushion supporting arrangement for horizontal conveyance. More particularly, it relates to a fluid-cushion supporting arrangement for horizontal conveyance with high fluid pressure and controltechnological stabilization, suitable for assembly conveyance of heavy loads and respectively high slender bodies on slide tracks.

Horizontal conveyance of loads with the aid of conveying means supported by fluid cushions is known in the art. The principal advantage of this conveyance is a low friction between a base surface and a conveying means, which makes possible easy displacement of the latter. The distance between the base surface and the fluid-cushion supporting arrangement must be less than 1 mm. This condition is satisfied with completely plane slide tracks adjusted with high accuracy. The known fluid-cushion supporting arrangements have, however, considerable leakage losses of the fluid medium and thereby high energy losses and environmental loads. These disadvantages are reduced by sealing pistons or inflatable sealing elements composed of an elastic material and arranged in the marginal zone of the fluid pressure chamber. It is known that the fluid is admitted to the sealing pistons via separate air control systems and acts for the respective adjustment region with the equivalent prestressing force sealingly toward the slide tracks. This solution which has an expensive construction possesses the disadvantage that a continuous reduction of the applied control pressure in dependence on the hovering height is not possible.

Another known arrangement makes use of several piston seals for control and fixedly adjusted pressure throttling valves for the respective pressure region. They also exclude continuous pressure reduction with increase of the hovering weight. In this arrangement the sealing gap between the sealing piston and slide track may be, however, pressure controlled only from outside by the respective adjustment more or less irregularly. All inflatable torus sealing sliders of the known air-cushion constructions are in direct connection with the pressure chamber under the supporting plate. The hovering height of these platforms is adjusted in correspondence with the respective cushion pressure, designed variable and not controllable.

SUMMARY OF THE INVENTION

Accordingly, it is an object of the present invention to provide a fluid-cushion supporting arrangement for horizontal conveyance which avoids the disadvantages of the prior art.

More particularly, it is an object of the present invention to provide a fluid-cushion supporting arrangement for horizontal conveyance, which avoids the disadvantages of the prior art.

Furthermore, it is an object of the present invention to provide a fluid-cushion supporting arrangement which is suitable for utilization at construction sites for horizontal conveyance of heavy loads and/or high slender bodies and is less energy-consuming and at the same time is characterized by reduced fluid losses and lower environmental loads, as compared with the known arrangements.

In keeping with these objects and with others which will become apparent hereinafter, one feature of the present invention resides, briefly stated, in a fluid-cushion supporting arrangement for horizontal conveyance which has a supporting platform with central and marginal portions, a flexible angular sealing element formed as a sealing piston in the region of the marginal portion of the supporting platform and having a horizontal leg which extends toward the center and forms together with the supporting platform a fluid chamber, and a vertical leg which forms together with the supporting platform a control pressure chamber and is vertically adjustably inserted in the control pressure chamber, an inlet for supplying the fluid into the fluid chamber, a passage with a pressure regulating element arranged to communicate the fluid chamber with the control pressure chamber so that the fluid from the fluid chamber can act upon the control pressure chamber in a pressure dependent manner, a first sensor associated with the horizontal leg of the sealing piston so that the horizontal leg is in height-dependent contact via the first sensor with the inlet means, and a second sensor associated with the pressure regulating element and extending into the control pressure chamber so as to be in contact with the vertical leg of the sealing piston.

When the arrangement is designed in accordance with the present invention, it is suitable for application on construction sites for horizontal conveyance of heavy loads and/or high slender bodies and at the same time has a lower energy consumption, decreased fluid losses and produces lower environmental loads as compared with the known arrangements. The fluid medium is applied in a low-loss manner by increasing of the sealing action with the fluid pressure up to 1.5 MPa, as well as with reduction of friction between the sealing element and slide track. The supporting arrangement is controllable with stable height, and it can be used also in conditions at construction sites where the slide tracks are not horizontally adjusted.

The flexible sealing element can be formed as a fabric element, and the first and second sensors can be formed as part of the inlet and the pressure-regulating element respectively. In accordance with another feature of the present invention, the horizontal leg of the sealing piston may be provided with a plurality of throughgoing openings or connected with a radially reinforced apertured plate to stiffen the horizontal leg. The bottom-side stiffening or reinforcement of the sealing piston with the apertured plate is provided for fluid discharge which increases the fluid cushion between the slide track and the supporting platform. This feature is advantageously used in the cases when the slide tracks are not horizontally adjusted.

The pressure in the control pressure chamber above the sealing piston is continuously changed in dependence upon the hovering height and without foreign supply by a pressure regulating element and solely by the fluid medium of the fluid chamber under the supporting platform in dependence upon the hovering height. This pressure regulation controls, with the seated supporting platform, the height sealing pressure between the sealing piston and the slide track. The sealing pressure increases with the increase of the hovering height of the supporting platform continuously and leads with a predetermined hovering height to an equilibrium between the working pressure under the supporting platform and the contact pressure of the sealing piston. Thereby the friction value during the conveyance phase is considerably reduced, which is especially advantageous for high fluid pressure.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
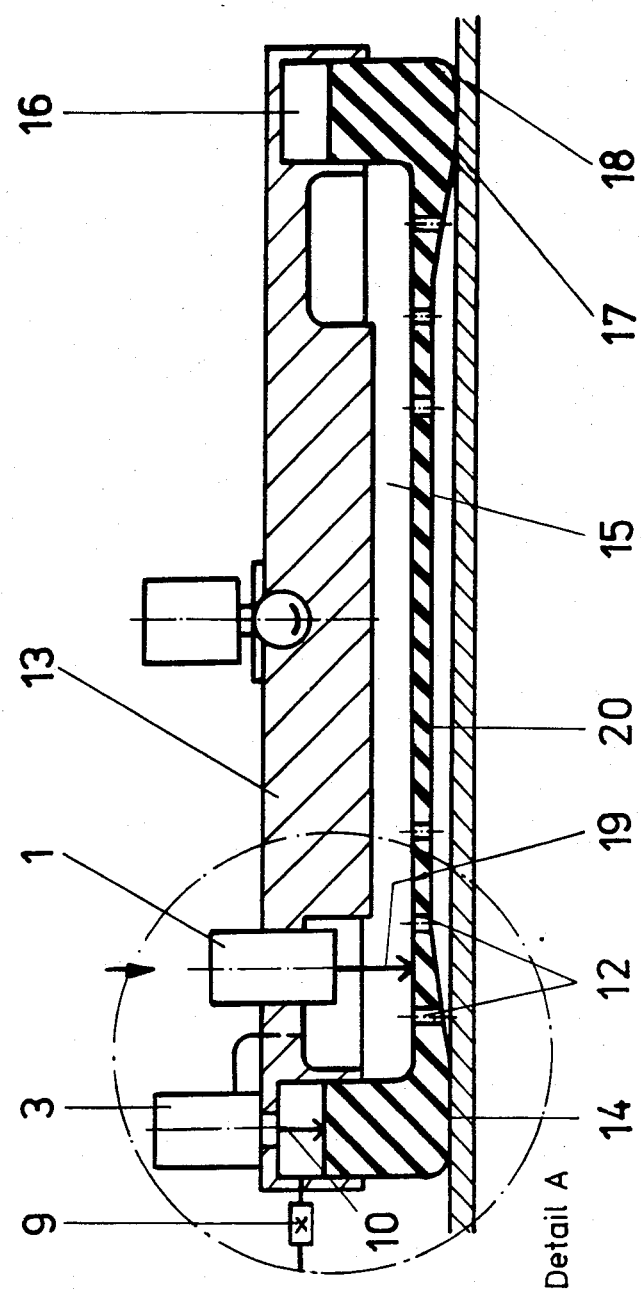
FIG. 1 is a view showing a vertical section of a fluid-cushion supporting arrangement in accordance with the present invention.
Figure 2:
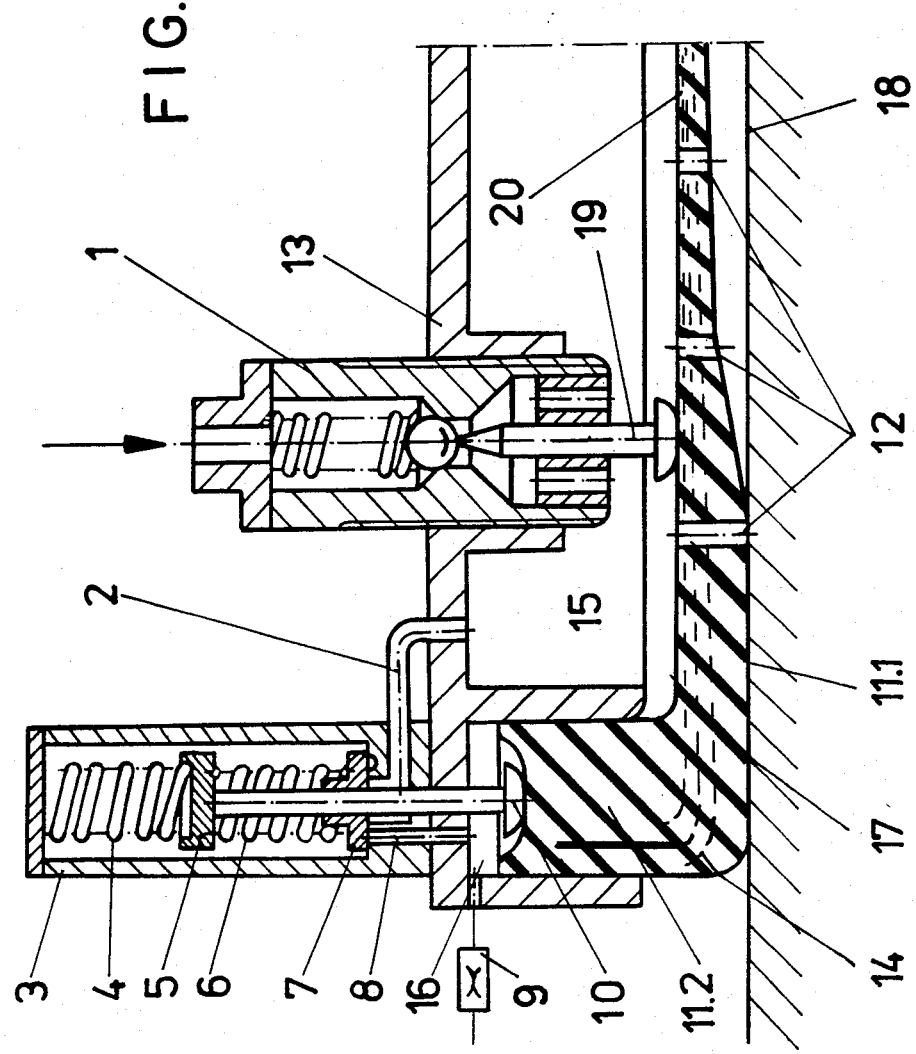
FIG. 2 is a view showing a fragment of the inventive arrangement on an enlarged scale.

A fluid-cushion supporting arrangement for horizontal conveyance in accordance with the present invention has a supporting platform which is identified with reference numeral 13. A flexible angular element 14 is located under the supporting plate 13 in the region of its marginal portion and is formed as a sealing piston. The supporting platform 13 is preferably designed in a circular manner whereas the sealing piston 14 is preferably designed in an annular manner. The supporting platform 13 and the sealing piston 14 together form a fluid chamber 15 and a control pressure chamber 16.

A pressure regulating device 3 is arranged in the end region of the supporting plate 13, and an inlet valve 1 is provided in the supporting platform 13 and particularly in its region which is closer to the center. The pressure regulating device 3 has a sensor 10 which extends into the control pressure chamber 16 and is in contact with the sealing piston 14. The inlet valve 1 is provided with a sensor 19 which extends into the fluid chamber 15 and is also in contact with the sealing piston 14.

As can be seen from the drawing, the sealing piston 14 includes a substantially horizontal leg which is identified with reference numeral 11.1 and a substantially vertical leg which is identified with reference numeral 11.2. The substantially horizontal leg 11.1 limits from below the fluid chamber 15, whereas the substantially vertical leg 11.2 limits from below the control pressure chamber 16. The sensor 10 of the pressure-regulating device 3 is in contact with the vertical leg 11.2 of the sealing piston 14, and the sensor 19 of the inlet valve 1 is in contact with the horizontal leg 11.1 of the sealing piston.

For avoiding inadmissable expansion of the flexible sealing piston 14, the sealing piston which is formed as a ring-shaped body is stiffened at its bottom side by a textile-reinforced bottom plate 20. The bottom plate 20 is provided with openings 12 which permit exit of the fluid to a slide track 18 or a sealing gap 17. The pressure relation between the fluid chamber 15 and the control pressure chamber 16 is carried out with the aid of the pressure-regulating device 3. The pressure-regulating device 3 is connected by a passage 2 with the fluid chamber 15 and by a passage 8 to the control pressure chamber 16. The pressure-regulating device 3 has a valve plate 7 provided with a valve spring 6 and slidable on a shaft of the sensor 10. It also has a spring plate 5 provided with a helical compression spring 4.

A fluid flow generated by a pump or a compressor travels via the inlet valve 1 into the fluid chamber 15 which is filled with the fluid medium. When the pressure develops, the fluid medium flows via the passage 2 toward the valve plate 7 of the pressure-regulating device 3. In a pause the sealing piston 14 is fully positioned inside the piston guide limited by the supporting platform 13. More particularly, the leg 11.2 of the sealing piston 14 is fully inserted in the control pressure chamber 16. The sensor 10 of the pressure-regulating device 3, which is loaded by the upper spring 4, is pressed upwardly and releases by the spring plate 5 the lower valve spring 6. The valve plate 7 which is freely slidable on the shaft of the sensor 10 allows in this position free fluid flow to the passage 8 and therefore into the control pressure chamber 16. In the pause the pressure in the fluid chamber 15 corresponds to the pressure above the leg 11.2 of the sealing piston 14 in the control pressure chamber 16.

The sealing action in the sealing gap 17 is complete. With increasing generation of pressure, lifting of the supporting platform 13 with the respective load takes place. With increase of the hovering height, the sensor 10 of the pressure-regulating device follows the downwardly pressed leg 11.2 of the sealing piston 14 and moves downwardly so that the spring plate 5 presses the valve spring 6 continuously against the valve plate 7. The pressure in the control pressure chamber 16 applied via the passage 8 thereby decreases. The height-dependent pressure reduction in the control pressure chamber 16 is stabilized with the aid of a relief throttle 9. When the predetermined hovering height is reached, the supporting platform 13 closes the inlet valve 1. In this conveyance position the pressure relief on the sealing piston 14 in the sealing gap 17 leads to the beginning of fluid passage from the fluid chamber 15 outwardly through the openings 12. In relation to the admissible friction during conveyance between the sealing piston and the slide track 18 to the fluid loss, there is a reciprocal adjustment of the inlet valve 1 to the pressure-regulating device 3.

Another possibility of the reciprocal adjustment of the inlet valve 1 to the pressure-regulating device 3 is provided by a changeable prestress of the pressure spring 4 and the valve spring 6 of the pressure-regulating device 3 from outside. A foreign supply of the control medium is dispensed within the inventive arrangement, inasmuch as the pressure in the fluid chamber 15 is always equal to or higher than the pressure in the control pressure chamber 16 above the sealing piston 14.

It will be understood that each of the elements described above, or two or more together, may also find a useful application in other types of constructions differing from the types described above.

While the invention has been illustrated and described as embodied in a fluid-cushion supporting arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various modifications without omitting features that, from the standpoint of prior art, fairly constitute essential characteristics of the generic or specific aspects of this invention.

What is claimed as new and desired to be protected by Letters Patent is set forth in the appended claims.

We claim:

1. A fluid-cushion supporting arrangement for horizontal conveyance, comprising
    a supporting platform having a center and a marginal portion;
    a flexible angular sealing element arranged under said platform in the region of said marginal portion and formed as a sealing piston, said sealing piston having a substantially horizontal leg which extends toward said center and forms together with said supporting platform a fluid chamber, and a substantially vertical leg which forms together with said supporting platform a control pressure chamber and is vertically adjustably inserted in the latter;
    inlet means for supplying a fluid into said fluid chamber;
    communicating means including a passage communicating said fluid chamber with said control pressure chamber;
    a pressure-regulating element arranged in said passage;
    first sensing means arranged to contact with said substantially horizontal leg of said sealing piston and associated with said inlet means so that said inlet means supplies the fluid into said fluid chamber in dependence upon a height of said substantially horizontal leg of said sealing piston, sensed by said first sensing means; and
    second sensing means extending into said control pressure chamber so as to be in contact with said substantially vertical leg of said sealing piston and associated with said pressure-regulating element, so that in dependence upon a position of said second sensing means, which is determined by a pressure in said control pressure chamber and therefore by a height of said sealing piston, said communicating means is opened or closed for flowing of the fluid from said fluid chamber into said control pressure chamber or vice versa, so as to change a pressing force of said sealing piston.

2. A fluid-cushion supporting arrangement for horizontal conveyance as defined in claim 1, wherein said flexible angular sealing element is formed as a fabric element.

3. A fluid-cushion supporting arrangement for horizontal conveyance as defined in claim 1, wherein said first sensing means includes a first sensor which is a part of said inlet means, whereas said second sensing means includes a second sensor which is a part of said pressure-regulating element.

4. A fluid-cushion supporting arrangement for horizontal conveyance as defined in claim 1, wherein said substantially horizontal leg of said sealing piston is provided with a plurality of throughgoing openings.

5. A fluid-cushion supporting arrangement for horizontal conveyance as defined in claim 1; and further comprising a radially reinforced apertured plate connected with said substantially horizontal leg of said sealing piston to stiffen said substantially horizontal leg.

6. A fluid-cushion supporting arrangement for horizontal conveyance as defined in claim 1, wherein said second sensing means includes a sensor having a shaft, said pressure-regulating element including a valve plate slidably arranged on said shaft of said sensor and a valve spring acting upon said valve plate.

7. A fluid-cushion supporting arrangement for horizontal conveyance as defined in claim 6, wherein said sensor has a head which is connected with said shaft and is in contact with said substantially vertical leg of said sealing piston.

8. A fluid-cushion supporting arrangement for horizontal conveyance as defined in claim 1; and further comprising a relief throttle communicating with said control pressure chamber.

* * * * *